Aug. 15, 1972　　　A. R. MARMO　　　3,684,703
SEPARATION PROCESS AND APPARATUS

Original Filed March 25, 1968　　　3 Sheets-Sheet 3

WITNESSES:

INVENTOR
Anthony R. Marmo
BY
ATTORNEY

3,684,703
SEPARATION PROCESS AND APPARATUS
Anthony R. Marmo, Cheswick, Pa., assignor to Westinghouse Electric Corporation, Pittsburgh, Pa.
Continuation of application Ser. No. 715,636, Mar. 25, 1968. This application Sept. 8, 1970, Ser. No. 69,896
Int. Cl. B03d 1/00
U.S. Cl. 210—13                                                                       4 Claims

ABSTRACT OF THE DISCLOSURE

The treatment system of this invention includes a process and apparatus for sequentially subjecting particulate matter in a liquid medium to comminution, aeration, flotation and digestion or incineration. Aeration prepares the particulate matter so that the influent to a flotation cell is of a proper size and consistency for maximum separation and minimum detention under the action of minute gas bubbles of the size produced by electrolysis in the flotation cell. The solid particles which are thereby carried to the surface of the flotation cell are periodically overflowed into a digester or incinerator by closing the plant effluent line which carries the clearified liquid from the plant. A modular design is utilized to allow for expanding system's requirements.

CROSS-REFERENCE TO RELATED APPLICATIONS

This is a continuation of application Ser. No. 715,636, filed Mar. 25, 1968 by Anthony R. Marmo, now abandoned.

BACKGROUND OF THE INVENTION

This invention relates to sewage treatment plants, and more particularly to separation plants having a prepared influent.

Certain prior art sewage treatment plants, or more generically separating apparatus, utilized electrolytic means to produce the minute gas bubbles necessary for efficient separation. A review of this field would seem to indicate that much work has been done on the development of means for producing the most efficient size gas bubbles for separation. However, recent studies have found that the efficiency of separation and thus the achievable through-put also depends upon the characteristics of the particulate matter to be separated. The particulate matter consists primarily of organic matter and viscous bacteria.

It is hypothesized that the size and consistency of solid matter in the influent to the electrolytic cell can appreciably affect the speed and efficiency of separation. In general, it is thought with respect to the prior art systems that the particulate organic matter tended, on the average, to be larger and more dense than maximum through-put required and that the bacteria tended to be too small.

SUMMARY OF THE INVENTION

The aforementioned omissions from the prior art systems are corrected by providing a prepared influent for a separation cell.

Recognizing that the characteristics of the influent to the flotation cell can limit the speed and efficiency of separation, this invention makes use of a pre-flotation cell wherein the sewage undergoes preparation for subsequent separation by suitable means such as by electrolytically stimulated flotation. The pre-flotation cell, which also serves as a surge tank, is essentially an aeration chamber. The particulate matter is subject to a high degree of stirring and tumbling under the stimulative action of relatively large air bubbles. This action has the effect of reducing the size of the particles of organic matter and rendering them somewhat fluffy. Moreover, since the bacteria is aerobic, i.e., thrives under the influence of oxygen, its tendency to consume the surrounding organic matter and increase in size is greatly enhanced.

A comminutor or grinder is provided at the inlet side of the aeration tank to insure that solid matter which is too large or dense to be properly sized and constituted by this pre-flotation operation will be fragmented.

As mentioned, the aeration tank also serves as a surge tank. It therefore provides system capacity for peak flow periods. This affects an appreciable reduction in size of the plant when coupled with the low detention time flotation system of this invention.

In the flotation cell electrodes produce minute gas bubbles which attach themselves to the particulate matter and carry these solids to the liquid surface of the tank where they remain in the form of a frothy foam. Electrolytically produced gas bubbles are preferred because of their size. Large gas bubbles have very little tendency to adhere to the particles or flocs due to their size and higher velocity in rising to the surface and further have a tendency to cause detrimental flow patterns which inhibit flotation.

The frothy foam which rises to the surface in the flotation cell may then be overflowed into a digester or incinerator by closing the effluent line leading from the flotation cell or by other suitable means such as skimming. In the case of the digester approach, the separated particulate matter decomposes under well known circumstances by a biological process, while, in the case of incineration, it is destroyed by a burning process.

Clear liquid is drawn off below the surface of the separation cell and may be discharged to a receiving stream. If chlorination is required, chlorine may be injected into the separation cells which are designed to perform this additional function.

In summary, it should be recognized that aeration prior to flotation is necessary to achieve in a separation plant higher through-put rates and more complete separation than previously obtainable.

DESCRIPTION OF THE DRAWINGS

For a better understanding of the invention reference may be had to the accompanying drawings in which.

DESCRIPTION OF THE PREFERRED EMBODIMENT

Figure 1:
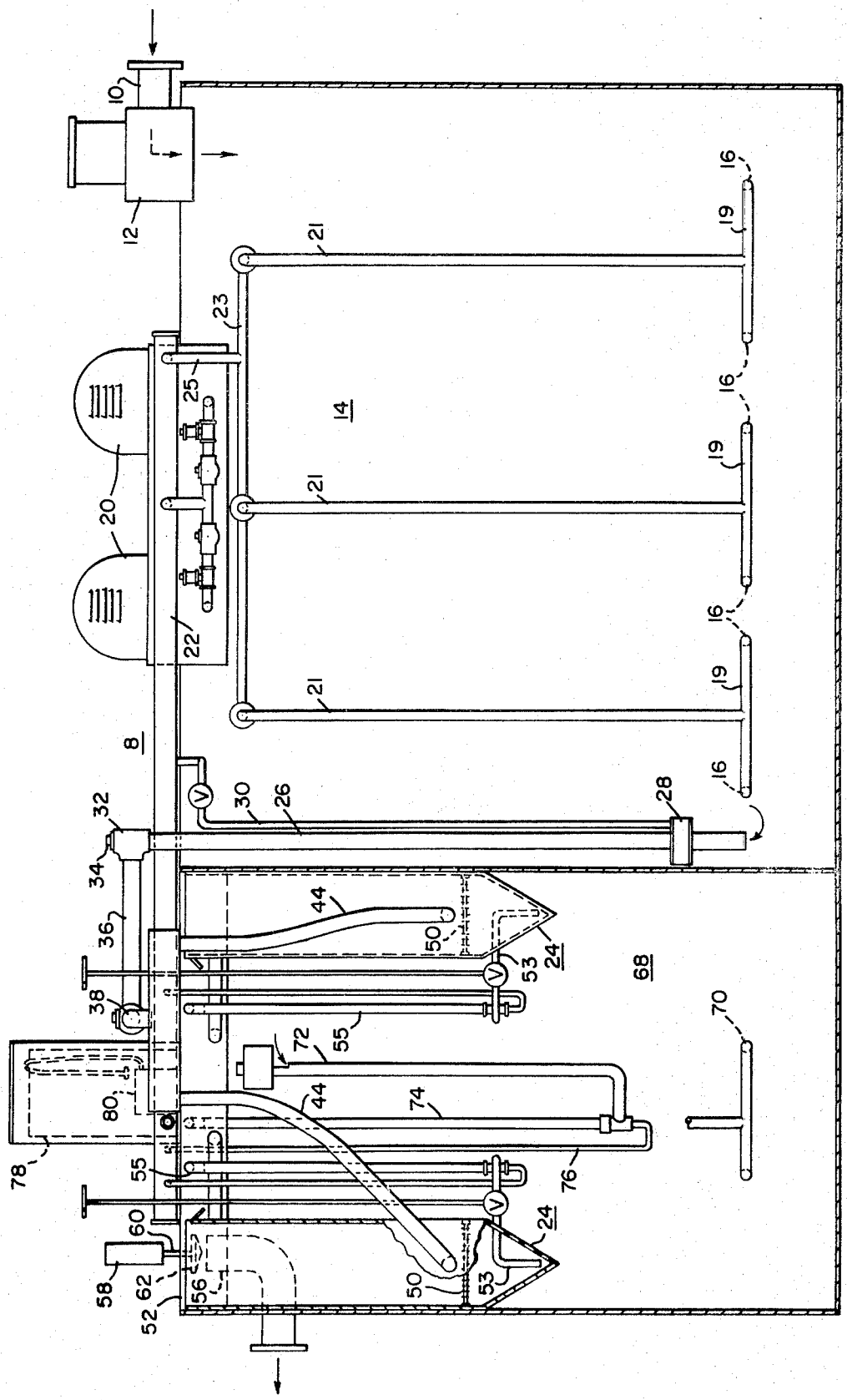
FIG. 1 is a sectional view of a separation plant in accordance with this invention.
Figure 2:
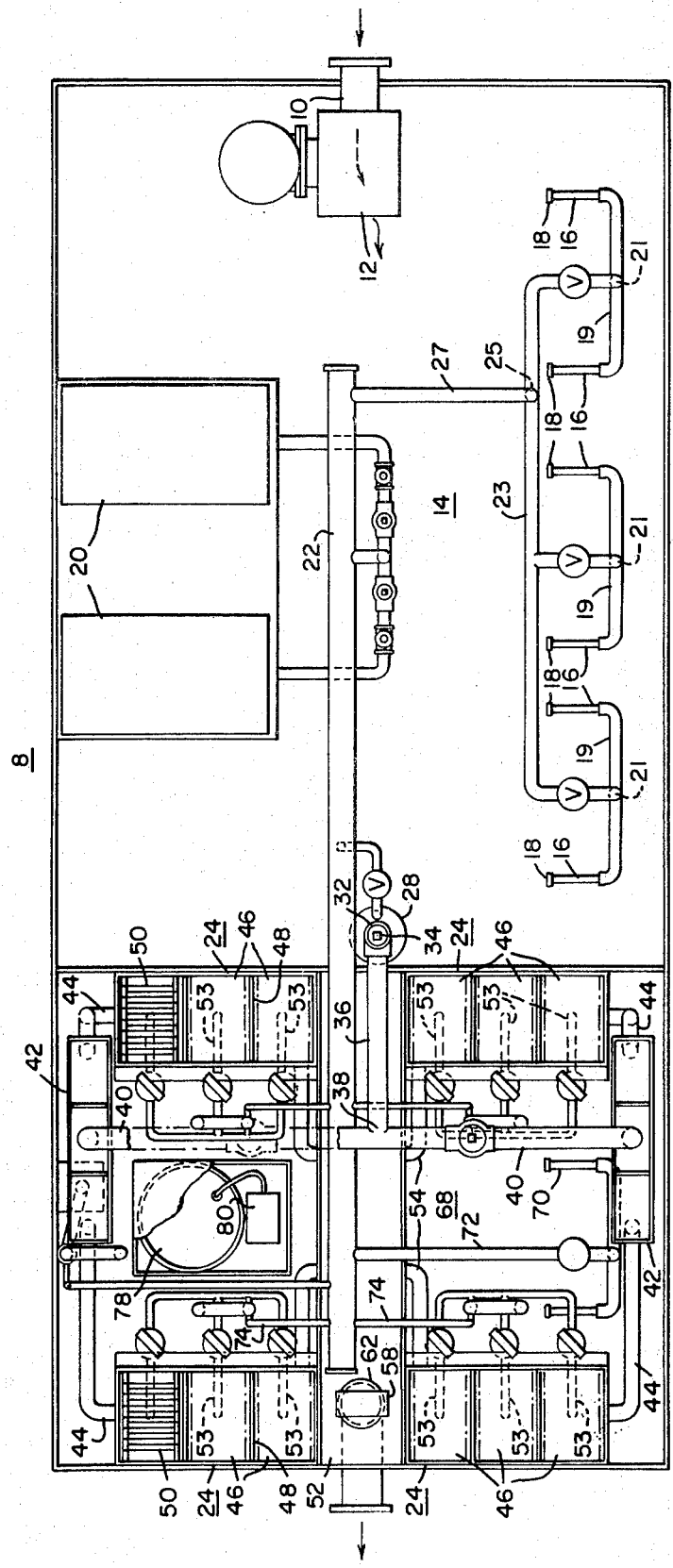
FIG. 2 is a plan view of the separation plant in accordance with this invention.

Referring to FIGS. 1 and 2, a separation plant 8 is shown wherein sewage or other particulate matter carried in a liquid medium enters the separation plant 8 through an influent line 10. The influent line 10 conveys the inlet stream to a comminutor 12, of conventional design, and which shreds any large solids which would otherwise have a deleterious affect upon the system to a predetermined maximum size.

The stream then enters a relatively large receptacle 14 which serves both as a surge tank and a preparation tank for the influent before it undergoes separation. The stream enters receptacle 14 near its top and the solid matter therein has a tendency to fall under the influence of gravity.

Near the bottom of the receptacle 14 along one side thereof are a plurality of diffusers 16 having end caps 18 mounted on their inwardly directed ends. The diffusers 16 are connected to air blowers 20 which are shown mounted above the aeration chamber or receptacle 14 through suitable piping; here shown generally as conduits 19, 21, 23, 25 and 27. It may be noted that the air blower 20 is connected to a single centrally located air manifold 22 which extends almost the full length of the treatment apparatus 8. As will be seen, all of the air carrying pipes, and in particular conduit 27, are connected to the central manifold 22 which reduces the complexity of the system.

The diffusers 16 produce a relatively heavy stream of relatively large air bubbles which cause the solid particles to move across the bottom of the receptacle 14 and then upwardly toward the top of the receptacle 14. This results in a circulation pattern which causes the particles to describe a generally helical path from the right of the aeration chamber 14 to the left side, as depicted. In their course the solid particles are constantly stirred and tumbled so that the organic matter is generally reduced in size. The action of the diffused air upon the particles also tends to render the organic matter somewhat fluffy. Moreover the bacteria in the sewage being aerobic is stimulated by the oxygen in the aeration chamber 14 so as to consume greater amounts of organic matter and grow in size. The overall effect is that the particles of organic matter and bacteria are so sized and constituted during their passage through the preparation tank 14 that separation may proceed more swiftly and at a higher level of efficiency in the separation chambers 24, as will be described.

At one end and toward the bottom of the surge or aeration chamber 14 there is situated a vertically extending outlet pipe 26 for the receptacle 14. A metering pump 28 is connected to the outlet pipe 26 so as to produce a constant flow of aerated matter through this pipe regardless of the rate of inflow of raw matter to the receptacle 14. The metering pump 28 is, in this example, of the airlift type and is fed with a constant source of air pressure through a metering pump inlet line 30 connected to the air manifold 22.

The aerated stream exiting from the surge and aeration receptacle 14 through outlet pipe 26 is then carried to separation chambers 24 where the solid particles may be separated from the clear liquid. This invention makes use of a modular scheme of separation chambers so as to build inherent flexibility into the system. In accordance with this scheme the sewage is first carried through the outlet pipe 26 to a clean-out junction 32 which is sealably closed by a head assembly 34 which may be removed in the event that clogging takes place in this locale. As exemplified, a conduit 36 then carries the fluid to a T-junction 38 having connecting conduits 40 which distribute the particulate matter among a plurality of cell inlet boxes 42. Here two conduits 40 and two cell inlet boxes 42 are shown although it should be obvious that a greater number may be used. The cell inlet boxes 42 are designed as constant head weir boxes which meter the same amount of flow to each separation chamber 24. As may best be seen in FIG. 1, the flow is distributed from the weir type inlet boxes 42 through a plurality of feed lines 44.

As exemplified, four separation chambers 24 are used. The two on either side of the longitudinal center line in FIG. 2 are connected to the same cell inlet box 42. It should now be obvious that with this modular approach additional or fewer separation chambers 24 may be introduced into this embodiment as flow conditions dictate.

In general, the separation chambers 24 must be designed such that minute gas bubbles are formed near their bottom. These light gas bubbles ascend to the surface of the separation cell through the liquid causing the solids to migrate to the surface where they form a foam or scum. The minute gas bubbles may be formed by a number of different well known processes. For example, by forcing air through a diffuser having small holes therein, or by reducing the pressure on a super saturated liquid or preferably by the electrolytic process which is exemplified in this embodiment. The minute gas bubbles so produced which are well known to be approximately 1000 microns in diameter. This should be contrasted with bubbles of the size produced by an aeration diffuser or other such means which are well known to be approximately 1000 microns in diameter (see Unit Operations of Sanitary Engineering, Linvil G. Rech, 1961, pp. 110, 111).

As exemplified feed lines 44 enter the separation chambers 24 at one end thereof and close to their bottom. Each chamber 24 is designed such that it is divided into three compartments 46 connected in series. The compartments 46 are separated by transfer baffles 48 which transfer the liquid from the top portion of each compartment to the bottom of the following compartment. Near the bottom of each compartment 46 of the separation chambers 24 is a set of electrodes 50. A source of electrical energy is put across the electrodes which ionizes the liquid in the compartments 48 into hydrogen ions and hydroxide ions. The hydrogen ions from the liquid are attracted to the cathode electrode where very minute hydrogen gas bubbles are formed. The hydroxide ions are attracted to the anode where they are broken down giving off nascent oxygen which tends to satisfy the biological oxygen demand of the bacteria. As indicated the light gas bubbles ascend relatively slowly to the surface of the flotation cell causing the solids to migrate with them to the surface. The influent to the separation chambers 24 thus proceeds from the side furthest from the longitudinal center line of the plant 8 in FIG. 2 to the side nearest this center line having solid particles successively carried to the surface of the fluid as it passes through the series connected compartment 46. The clearified liquid discharge from the separation chambers which has had the solid particles removed therefrom is carried from all the chambers into an effluent box 52 through conduit 54.

Any solids which settle through the electrodes 50 are collected in the V-shaped bottom portion of the cells 24. These solids may be periodically removed through outlet lines 53 when an airlift line 55 is actuated, and may then be reprocessed.

It is noted that the relatively high flow rate and degree of separation of this invention could not be achieved without pre-aerating the influent prior to flotation. In the absence of aeration, particles would be "seen" by the flotation cell which could not be separated efficiently without lengthy detention in the flotation cell.

Figure 3:
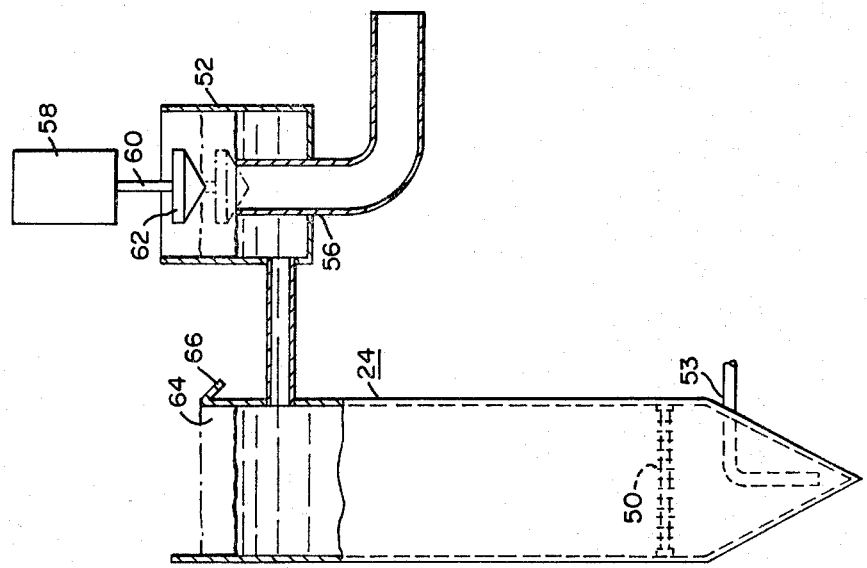
FIG. 3 shows the device uitlized to remove the separated solid particles from the separation tank or flotation cell.

As can be seen more clearly in the schematic drawing of FIG. 3 effluent box 52 contains a stand pipe 56 which both controls the level in the effluent box 52 and in the level in the separation chambers 24 and additionally serves the function of an effluent line which carries the clear liquor to the exterior of the system where it may be dumped into a stream. Located directly above the stand pipe 56 is a solenoid 58 operated by a timer not shown. The solenoid 58 is connected to a plunger 60 which has a stopper 62 which is situated and sized so as to sealably close the inlet end of the stand pipe 56 when the solenoid 58 is actuated.

When the solenoid 58 is actuated so as to stop discharge from the effluent box 52, the level in the effluent box 52 and the level in the separation chamber 24 rise together. The inner longitudinal side of each separation chamber 24 may be constructed so as to be slightly lower than the otherside and thus to produce an inwardly directed overflow when the level of the liquid is caused to rise above this lower portion 64. A lip 66 may be provided so as to prohibit the overflowing solid particles from running down the side of the separation chambers 24.

The overflow arrangement was selected to produce discharge of the solid particles in the form of a frothy foam from the surface of the separation chamber 24. Of course, other means such as a skimmer can be provided. However, mechanical means have a tendency to break up the foam and to cause some of the solid particles to go back into the clear liquor. The overflowing particles then fall into a digester 68 which is located directly beneath the separation chambers 24. In the digester 68 particulate matter may be decomposed by biological process as is well known in the art. A diffuser 70 is provided in the digester to which air is fed from the main air manifold 22 and which may be in all respect similar to the diffusers 16 in the aeration chamber 14 to aid in the biological process. The particulate matter is periodically settled to the bottom of the digester chamber 68 with any liquid present remaining on top. An outlet line 72 is provided from the digester 68 and attached to an airlift line 74 which is fed with a constant source of air through a line 76 from air manifold 22 to carry the liquid which remains above the particulate matter in the digester 68 back to the aeration tank 14.

The process thus may be seen to be one in which a constant flow of aerated sewage is carried to the separation chambers 24 and the clear liquor from the chambers 24 is substantially continuously drawn out of the plant 8 through the effluent line 56. The solid particles which are specially prepared for separation in the aeration chamber 14 are periodically overflowed into the digester 68 by the simple expedient of closing off the effluent stand pipe 56. This timer closes the inlet end of the stand pipe 56 for several minutes periodically, as for example every hour. The substantially continuous effluent flow of clear liquor from the chambers 24 is made possible by the forced separation scheme of this invention when coupled with the aeration preparation process of this invention.

In those locales where by virtue of local ordinance or for other reasons the effluent must be chlorinated, this may be accomplished by injecting the chlorine from a storage tank 78 through a hypochlorinator 80 into the separation chambers 24 which as designed may perform this dual function. The chlorine is also ionized which further aids the separation process.

I claim:

1. A process for separating solid particles consisting primarily of organic matter and viscous bacteria from a liquid medium in which they are suspended comprising sequentially:
    (a) pre-aerating the liquid medium by subjecting the medium to the action of relatively large air bubbles of the size produced by an aeration air diffuser;
    (b) subsequently subjecting the aerated medium to action of relatively minute gas bubbles of the size produced by electrode set so as to cause the solid particles to be carried to the surface of the liquid medium;
    (c) selectively discharging the thus aerated liquid medium to a stream or to a digester tank;
    (d) aerating the liquid medium in the digester tank and subsequent to aeration, discharging the liquid medium to a stream; and
    (e) removing the solid particles from the surface of the liquid medium.

2. The process of claim 1 wherein the size of bubbles produced by an aeration air diffuser is approximately 1000 microns and the size of bubbles produced by electrode set is generally between 70 and 90 microns.

3. An apparatus for separating solid particles from a liquid medium in which they are suspended comprising in combination:
    (a) a first receptacle;
    (b) means for supplying a liquid containing particulate matter consisting primarily of organic matter and viscous bacteria to said first receptacle;
    (c) means for producing relatively large air bubbles for aerating and agitating the liquid communicably coupled with the interior of said first receptacle;
    (d) a second receptacle communicably coupled to said first receptacle;
    (e) means for producing relatively small gas bubbles communicably coupled to said second receptacle whereby the gas bubbles cause the solid particles to be carried to the surface of said second receptacle;
    (f) means situated beneath the liquid surface of said second receptacle for removing clearified liquid from said second receptacle;
    (g) a metering pump coupled between the two said receptacles whereby the first receptacle serves as a surge tank from which a constant source of the prepared medium is conveyed by the pump to the second receptacle;
    (h) a digester associated with said second receptacle;
    (i) means for conveying the solid particles carried to the surface of said second receptacle into the digester;
    (j) said digester being located beneath the upper portion of said second receptacle;
    (k) a valve coupled to said means for removing clearified liquid from said second receptacle whereby the last mentioned means may be periodically rendered inoperative; and
    (l) said second receptacle having an opening slightly above its normal liquid level through which the solid particles may be discharged into the digester when said valve is closed.

4. A device for removing solid particles from the surface of a flotation type separation chamber comprising:
    (a) an effluent box communicably coupled with the separation chamber;
    (b) a standpipe within said effluent box whereby the liquid level is maintained constant in the effluent box and in the separation chamber to which it is coupled;
    (c) a valve for stopping flow through the standpipe;
    (d) said separation chamber having an opening above its normal liquid level through which the solid particles may discharge when the valve is closed.

References Cited

UNITED STATES PATENTS

| | | | |
|---|---|---|---|
| 3,510,001 | 5/1970 | Bear et al. | 210—44 X |
| 3,015,396 | 1/1962 | Quast | 210—44 X |
| 2,766,203 | 10/1956 | Brown et al. | 210—60 |

FOREIGN PATENTS

| | | | |
|---|---|---|---|
| 676,854 | 8/1952 | Great Britain | 204—186 |

OTHER REFERENCES

Babbitt, H. E.: Sewerage and Sewage Treatment, sixth edit., 1947, John Wiley & Sons, N.Y., pp. 316 and 317 relied on.

MICHAEL ROGERS, Primary Examiner

U.S. Cl. X.R.

204—149; 210—14, 202, 221, 256, 537